(12) United States Patent
Tseng

(10) Patent No.: US 11,314,289 B2
(45) Date of Patent: Apr. 26, 2022

(54) MAGNETIC CAMERA DEVICE APPLIED TO A NOTEBOOK COMPUTER

(71) Applicant: Cheng Uei Precision Industry Co., LTD., New Taipei (TW)

(72) Inventor: Chi-Ming Tseng, New Taipei (TW)

(73) Assignee: CHENG UEI PRECISION INDUSTRY CO., LTD., New Taipei (TW)

( * ) Notice: Subject to any disclaimer, the term of this patent is extended or adjusted under 35 U.S.C. 154(b) by 84 days.

(21) Appl. No.: 17/078,048

(22) Filed: Oct. 22, 2020

(65) Prior Publication Data

US 2021/0165467 A1    Jun. 3, 2021

(30) Foreign Application Priority Data

Dec. 3, 2019 (CN) .......................... 201922139050.9

(51) Int. Cl.
*G06F 1/16* (2006.01)
*H04M 1/02* (2006.01)

(52) U.S. Cl.
CPC ........ *G06F 1/1686* (2013.01); *H04M 1/0264* (2013.01); *H04M 2250/52* (2013.01)

(58) Field of Classification Search
CPC ............... G06F 1/1686; H04M 1/0264; H04N 5/23238; H04N 5/265; H04N 5/2251
See application file for complete search history.

(56) References Cited

U.S. PATENT DOCUMENTS

| 7,570,485 | B2 * | 8/2009 | Krah | G06F 1/1686 |
| | | | | 345/157 |
| 7,907,840 | B2 * | 3/2011 | Schack | H04N 5/2254 |
| | | | | 396/177 |
| 8,498,100 | B1 * | 7/2013 | Whitt, III | H01H 13/785 |
| | | | | 361/679.28 |
| 9,692,953 | B2 * | 6/2017 | Xiong | H04M 1/0264 |
| 10,938,969 | B2 * | 3/2021 | Li | F16M 11/046 |
| 11,140,249 | B2 * | 10/2021 | Chen | G06F 1/1686 |
| 2005/0014527 | A1 * | 1/2005 | Chambers | H04N 5/2252 |
| | | | | 348/E7.079 |
| 2005/0201047 | A1 * | 9/2005 | Krah | G06F 1/1616 |
| | | | | 361/679.55 |
| 2006/0033832 | A1 * | 2/2006 | Shin | H04N 5/2252 |
| | | | | 348/E5.026 |

(Continued)

*Primary Examiner* — Adrian S Wilson
(74) *Attorney, Agent, or Firm* — Cheng-Ju Chiang

(57) ABSTRACT

A magnetic camera device adapted for being assembled to a notebook computer. The notebook computer has a first connection unit which includes a first connector, and at least one first magnetic element located to at least one side of the first connector. The magnetic camera device includes a shell, an image module unit assembled in the shell, and a second connection unit assembled in the shell. The second connection unit is connected with the first connection unit. The second connection unit includes a second connector connected to the image module unit, and at least one second magnetic element fastened in the shell. A plurality of the contact portions of the second connector are exposed out of the shell to contact with the first connector. Magnetic poles of attracting surfaces between the at least one second magnetic element and the at least one first magnetic element are different.

17 Claims, 16 Drawing Sheets

(56) References Cited

U.S. PATENT DOCUMENTS

| | | | |
|---|---|---|---|
| 2006/0268505 A1* | 11/2006 | Krah | G06F 1/1679 |
| | | | 361/679.55 |
| 2008/0310094 A1* | 12/2008 | Burns | G06F 1/1616 |
| | | | 361/679.01 |
| 2011/0255289 A1* | 10/2011 | Krah | G06F 1/1686 |
| | | | 362/253 |
| 2019/0138062 A1* | 5/2019 | Zeng | H04M 1/0235 |
| 2021/0165303 A1* | 6/2021 | Tseng | G03B 17/02 |
| 2021/0165304 A1* | 6/2021 | Tseng | G03B 17/561 |

* cited by examiner

MAGNETIC CAMERA DEVICE APPLIED TO A NOTEBOOK COMPUTER

CROSS-REFERENCE TO RELATED APPLICATION

The present application is based on, and claims priority from, China Patent Application No. 201922139050.9, filed Dec. 3, 2019, the disclosure of which is hereby incorporated by reference herein in its entirety.

BACKGROUND OF THE INVENTION

1. Field of the Invention

The present invention generally relates to a camera device, and more particularly to a magnetic camera device applied to a notebook computer.

2. The Related Art

In general, a conventional camera device is mostly fastened to a top of a screen of a notebook computer, a screen frame of the notebook computer is designed towards a narrower and narrower edge on account of a market requirement, a foot stool structure of the camera device of the notebook computer will partially shield a screen window area, and a stability of the conventional camera device becomes worse to be easily fallen off under a limit area of the screen frame.

A china patent with a title of a magnetic camera device is disclosed. The magnetic camera device includes an enclosure. The enclosure includes a base, and an outer shell for being assembled with a camera module. The outer shell defines a lens hole. The magnetic camera device further includes at least one magnet disposed to an outside or an inside of the enclosure, and the at least one magnet is capable of being attracted to a metal object. A bottom surface of the enclosure is a plane. The plane of the enclosure is equipped with at least one locating hole and at least one blocking board. The at least one magnet is disposed in the at least one locating hole and is fastened by the at least one blocking board.

However, the magnetic camera device described above may be just used to the metal object, such as an object including an iron ware, and then the magnetic camera device is attracted to the metal object. Thus a usage occasion of the magnetic camera device appears inconvenient and an application of the magnetic camera device is inflexible.

Therefore, it is essential to provide an innovative magnetic camera device applied to the notebook computer.

SUMMARY OF THE INVENTION

An object of the present invention is to provide a magnetic camera device adapted for being assembled to a notebook computer. The notebook computer has a first connection unit which includes a first connector, and at least one first magnetic element located to at least one side of the first connector. The magnetic camera device is magnetically attracted to and fastened to a top of the notebook computer. The magnetic camera device is connected with the first connection unit to be conductive. The magnetic camera device includes a shell, an image module unit assembled in the shell, and a second connection unit assembled in the shell. The second connection unit is connected with the first connection unit. The second connection unit includes a second connector connected to the image module unit, and at least one second magnetic element. The second connector has a plurality of contact portions. The plurality of the contact portions of the second connector are exposed out of the shell to directly contact with the first connector. The at least one second magnetic element is fastened in the shell and is adjacent to at least one end of the second connector. Magnetic poles of attracting surfaces between the at least one second magnetic element and the at least one first magnetic element are different.

Another object of the present invention is to provide a magnetic camera device adapted for being assembled to a notebook computer. The notebook computer has a frame, a first connector mounted to the frame, at least one first magnetic element mounted to the frame and located to at least one side of the first connector, and a flexible print circuit board fastened to the frame and located under the first connector. The magnetic camera device is magnetically attracted to and fastened to the notebook computer. The magnetic camera device is connected with the notebook computer. The magnetic camera device includes a shell, an image module unit assembled in the shell, a second connector connected to the image module unit and at least one second magnetic element. The second connector has a plurality of contact portions. The plurality of the contact portions of the second connector are exposed out of the shell to directly contact with the first connector. The at least one second magnetic element is fastened in the shell and is adjacent to at least one end of the second connector. The at least one second magnetic element is located above and corresponding to the at least one first magnetic element. The at least one second magnetic element and the at least one first magnetic element are attracted with each other. Magnetic poles of attracting surfaces between the at least one second magnetic element and the at least one first magnetic element are different. A top of the flexible print circuit board is bent to form an elongated shape. The top of the flexible print circuit board is fastened to a lower surface of the first connector.

Another object of the present invention is to provide a magnetic camera device adapted for being assembled to a notebook computer. The notebook computer has a first connector, and at least one first magnetic element located to at least one side of the first connector. The first connector is exposed out of a top of the notebook computer. The magnetic camera device is magnetically attracted to and fastened to the top of the notebook computer. The magnetic camera device is connected with the notebook computer. The magnetic camera device includes a shell, an image module unit fastened in an inside of the shell, a second connector, at least one second magnetic element and a peep prevention switch. The second connector is connected to a lower end of the image module unit and assembled to the top of the notebook computer. The first connector is directly connected with the second connector. The at least one second magnetic element is fastened in the shell and is adjacent to at least one end of the second connector. The at least one second magnetic element is located above and corresponding to the at least one first magnetic element. The at least one second magnetic element and the at least one first magnetic element are attracted with each other. Magnetic poles of attracting surfaces between the at least one second magnetic element and the at least one first magnetic element are different. The peep prevention switch is mounted to a top of the shell. The peep prevention switch has a plurality of buckling blocks. The peep prevention switch has a shielding piece extended downward from a middle of one side of a bottom surface of the peep prevention switch. The shielding piece is located in front of the image module unit. The shell has a plurality of the sliding holes penetrating through the shell. The plurality of the buckling blocks are assembled in the plurality of the sliding holes, and each buckling block slides between two opposite ends of one sliding hole to make the shielding piece shield or be without shielding the image module unit.

As described above, each second magnetic element is mounted in one first fastening groove of the magnetic camera device, and each first magnetic element is mounted in one second fastening groove of the notebook computer, the magnetic poles of the attracting surfaces between each second magnetic element mounted in the one first fastening groove of the magnetic camera device and the one first magnetic element mounted in the one second fastening groove of the notebook computer are different, so when the magnetic camera device is assembled to the notebook computer, a correct assembling direction of the magnetic camera device and the notebook computer is identified, the second connector is arranged in and assembled in an insertion groove, the plurality of the contact portions of the second connector contact with the first connector of the notebook computer to form a conductive signal wiring by use of a magnetic attraction force between the at least one second magnetic element and the at least one first magnetic element. Furthermore, the magnetic camera device has the shielding piece, the shielding piece is arranged between the transparent piece and the image module unit for shielding the image module unit to prevent an embezzlement and a peep of the image module unit being operated by a network hacker, when the peep prevention switch moves towards a first direction, a buckling dome is buckled in a second buckling groove, the shielding piece shields the image module unit, when the peep prevention switch moves towards a second direction, the buckling dome is buckled in a first buckling groove, the shielding piece keeps away from the image module unit. Thus, the magnetic camera device is assembled to the top of the notebook computer by use of the magnetic attraction force between the at least one second magnetic element and the at least one first magnetic element, and the magnetic camera device prevents the embezzlement and the peep of the image module unit from being operated by the network hacker.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
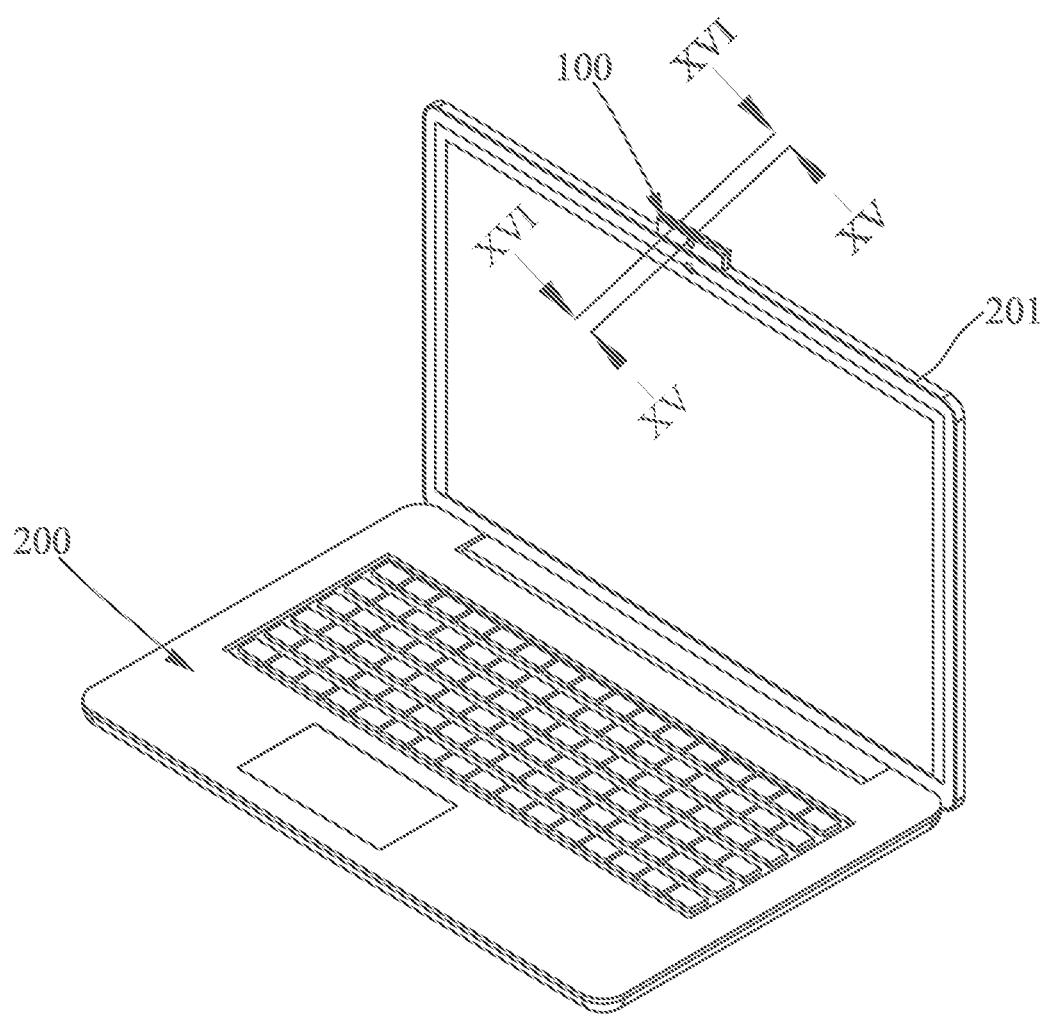
FIG. 1 is an assembly diagram of a magnetic camera device in accordance with the present invention, wherein the magnetic camera device is applied to a notebook computer.
Figure 2:
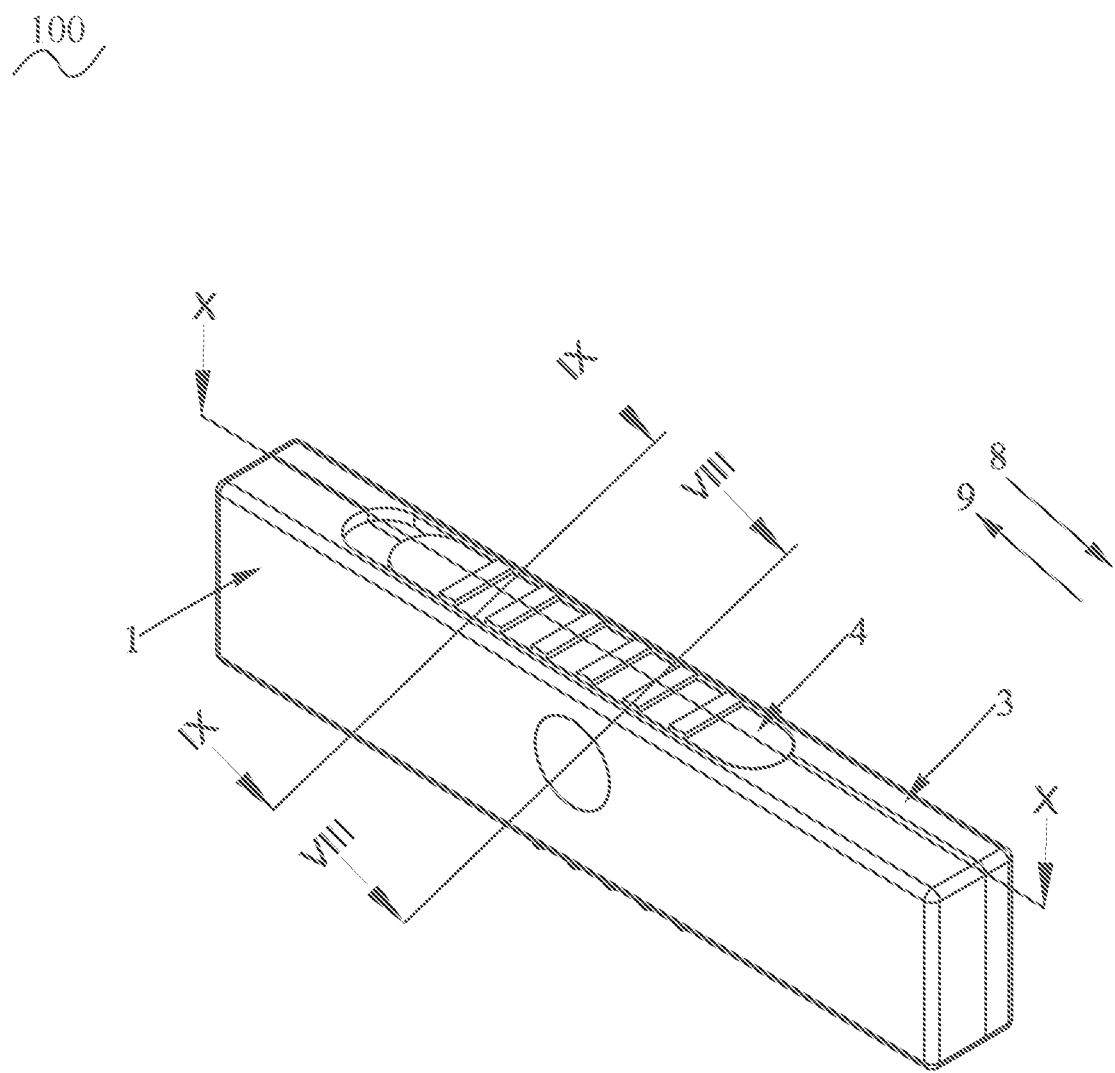
FIG. 2 is a perspective view of the magnetic camera device in accordance with the present invention.
Figure 3:
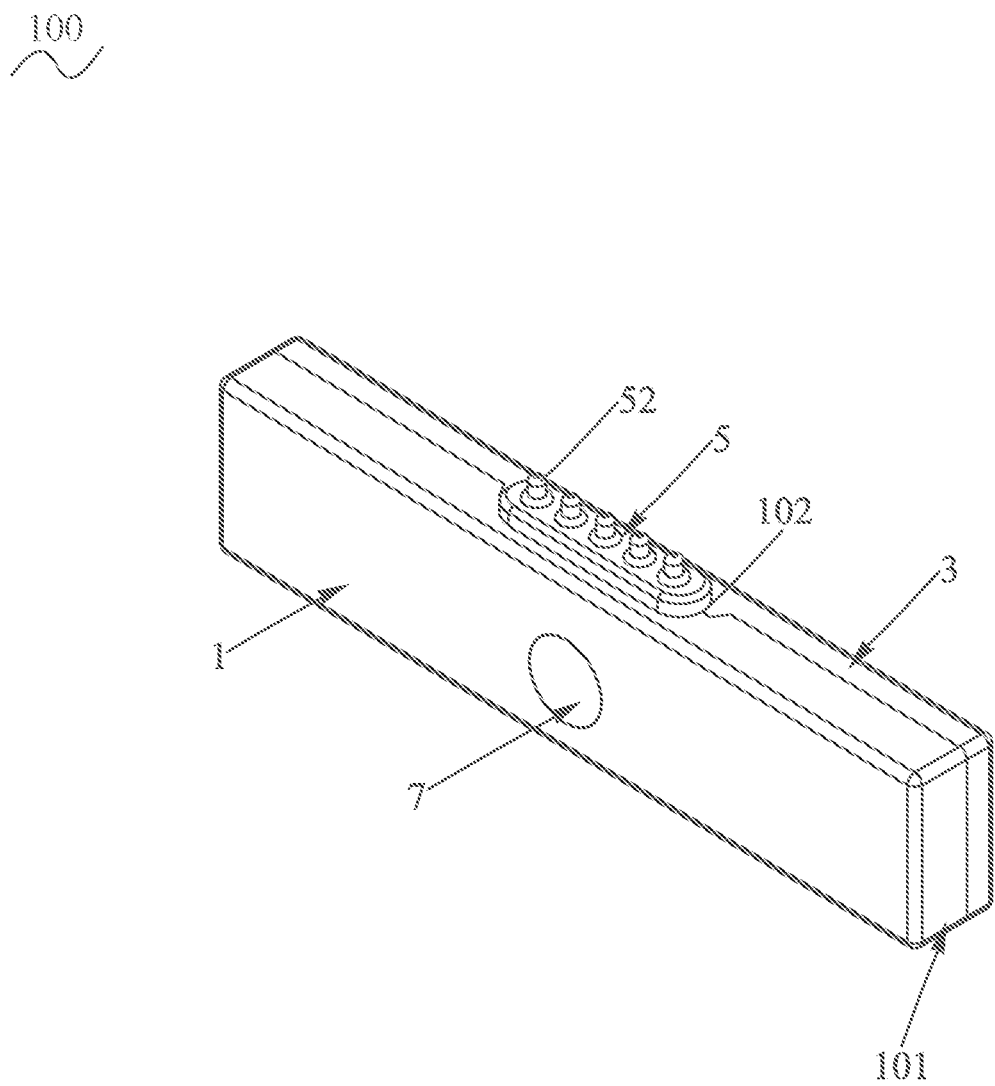
FIG. 3 is another perspective view of the magnetic camera device in accordance with the present invention.
Figure 4:
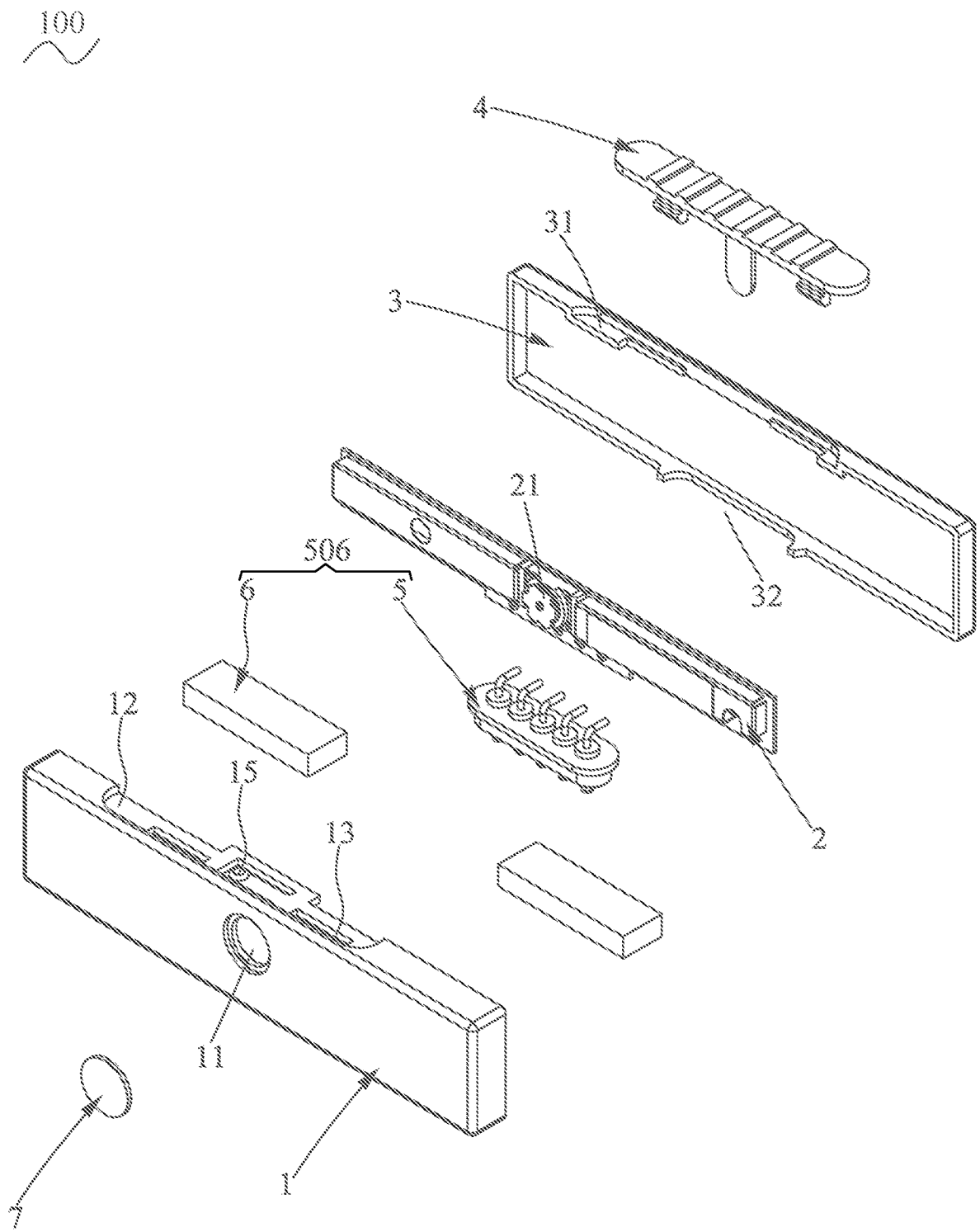
FIG. 4 is an exploded view of the magnetic camera device in accordance with the present invention.

With reference to FIG. 1 to FIG. 16, a magnetic camera device 100 in accordance with a preferred embodiment of the present invention is shown. The magnetic camera device 100 is applied to a notebook computer 200. The magnetic camera device 100 is adapted for being assembled to the notebook computer 200. The notebook computer 200 has a frame 201, an insertion groove 202, a flexible print circuit (FPC) board 205, a liquid display module 207, and a first connection unit 212 which includes a first connector 204, and at least one first magnetic element 208 located to at least one side of the first connector 204.

With reference to FIG. 1 to FIG. 5, the magnetic camera device 100 includes a shell 101 which includes a front cover 1 and a rear cover 3, an image module unit 2, a peep prevention switch 4, a second connection unit 506 which includes a second connector 5 and at least one second magnetic element 6, and a transparent piece 7. The magnetic camera device 100 further includes a plurality of second magnetic elements 6. The transparent piece 7 is shown as a circular shape. The second connector 5 is fastened in the shell 101 and is partially exposed out of the shell 101. The at least one second magnetic element 6 is fastened in the shell 101 and is adjacent to at least one end of the second connector 5. The image module unit 2 and the at least one second magnetic element 6 are fastened in an inside of the shell 101. The image module unit 2 and the at least one second magnetic element 6 are fastened in an inside of the front cover 1. The rear cover 3 is mounted to a rear of the front cover 1. The peep prevention switch 4 is mounted to a top of the shell 101. The peep prevention switch 4 is mounted to tops of the front cover 1 and the rear cover 3. The second connector 5 is connected to and soldered to a lower end of the image module unit 2 and is assembled to a top of the notebook computer 200. The second connector 5 is connected to the image module unit 2. The transparent piece 7 is fastened to a front surface of the front cover 1. The magnetic camera device 100 is attracted to the notebook computer 200 by the at least one second magnetic element 6. In the preferred embodiment, the front cover 1 and the rear cover 3 are assembled to form the shell 101. The second connector 5 and the at least one second magnetic element 6 form the second connection unit 506. The magnetic camera device 100 includes two second magnetic elements 6. The image module unit 2 and the second connection unit 506 are assembled in the shell 101.

Referring to FIG. 2 to FIG. 7, the front cover 1 has a location portion 11, a first concave surface 12, a plurality of sliding holes 13, a cantilever arm 14, a buckling dome 15, at least one first propping portion 111, at least one first fastening groove 16 and a first notch 17. The at least one first propping portion 111 is protruded upward from a bottom of the inside of the front cover 1. The at least one first propping portion 111 defines the at least one first fastening groove 16 penetrating through a rear surface of the front cover 1. The front cover 1 further includes a plurality of first propping portions 111 and a plurality of first fastening grooves 16. The plurality of the first propping portions 111 are protruded upward from the bottom of the inside of the front cover 1. The plurality of the first propping portions 111 define the plurality of the first fastening grooves 16 penetrating through the rear surface of the front cover 1.

A middle of the front surface of the front cover 1 is recessed rearward to form the location portion 11. The location portion 11 is shown as a circular shape. A middle of the location portion 11 longitudinally penetrates through the front cover 1 and is communicated with the inside of the front cover 1. The transparent piece 7 is buckled in and fastened in the location portion 11. The transparent piece 7 is located in the location portion 11. The transparent piece 7 is used for prettifying the magnetic camera device 100. A middle of a top surface of the front cover 1 is recessed downward to form the first concave surface 12. The first concave surface 12 is connected with a corresponding structure of the rear cover 3. The shell 101 has the plurality of the sliding holes 13 penetrating through the shell 101. The first concave surface 12 has the plurality of the sliding holes 13 penetrating through the top of the front cover 1 and communicated with the inside of the front cover 1. Sliding mechanisms of the peep prevention switch 4 are buckled in and is able to slide along the plurality of the sliding holes 13 to make the peep prevention switch 4 be able to slide along the plurality of the sliding holes 13. The peep prevention switch 4 slides in a first direction 8 or a second direction 9. The first direction 8 and the second direction 9 are two opposite directions. The first direction 8 and the second direction 9 are opposite to each other.

A middle of the first concave surface 12 is punched to form the cantilever arm 14 extending in the second direction 9 opposite to the first direction 8. A top surface of a tail end of the cantilever arm 14 protrudes upward to form the buckling dome 15. When the peep prevention switch 4 slides towards the first direction 8 or the second direction 9, the buckling dome 15 is used for being buckled with different buckling portions of the peep prevention switch 4 to be switched to different positions of the peep prevention switch 4. A lower end of at least one side of the inside of the front cover 1 is recessed inward to form the at least one first fastening groove 16. Several portions of lower ends of two opposite sides of the inside of the front cover 1 are recessed inward to form the plurality of the first fastening grooves 16.

The at least one second magnetic element 6 is received in and fastened in the at least one first fastening groove 16. The plurality of second magnetic elements 6 are received in the plurality of the first fastening grooves 16. In the preferred embodiment, the two opposite ends of the inside of the front cover 1 are recessed inward to form two first fastening grooves 16. Two first propping portions 111 are protruded upward from bottoms of the two opposite ends of the inside of the front cover 1. The two first propping portions 111 define the two first fastening grooves 16 penetrating through the rear surface of the front cover 1. The two second magnetic elements 6 are received in the two first fastening grooves 16. A middle of a rear of a bottom surface of the front cover 1 is recessed frontward to form the first notch 17.

The first notch 17 is matched with and connected with a second notch 32 of the rear cover 3. The second connector 5 is received in the first notch 17 and the second notch 32 of the rear cover 3.

In the preferred embodiment, the cantilever arm 14 of the front cover 1 is an elastic body. When the peep prevention switch 4 slides towards the first direction 8 or the second direction 9, the peep prevention switch 4 will have a segment fall feeling, a user easily identifies operating statuses.

Figure 5:
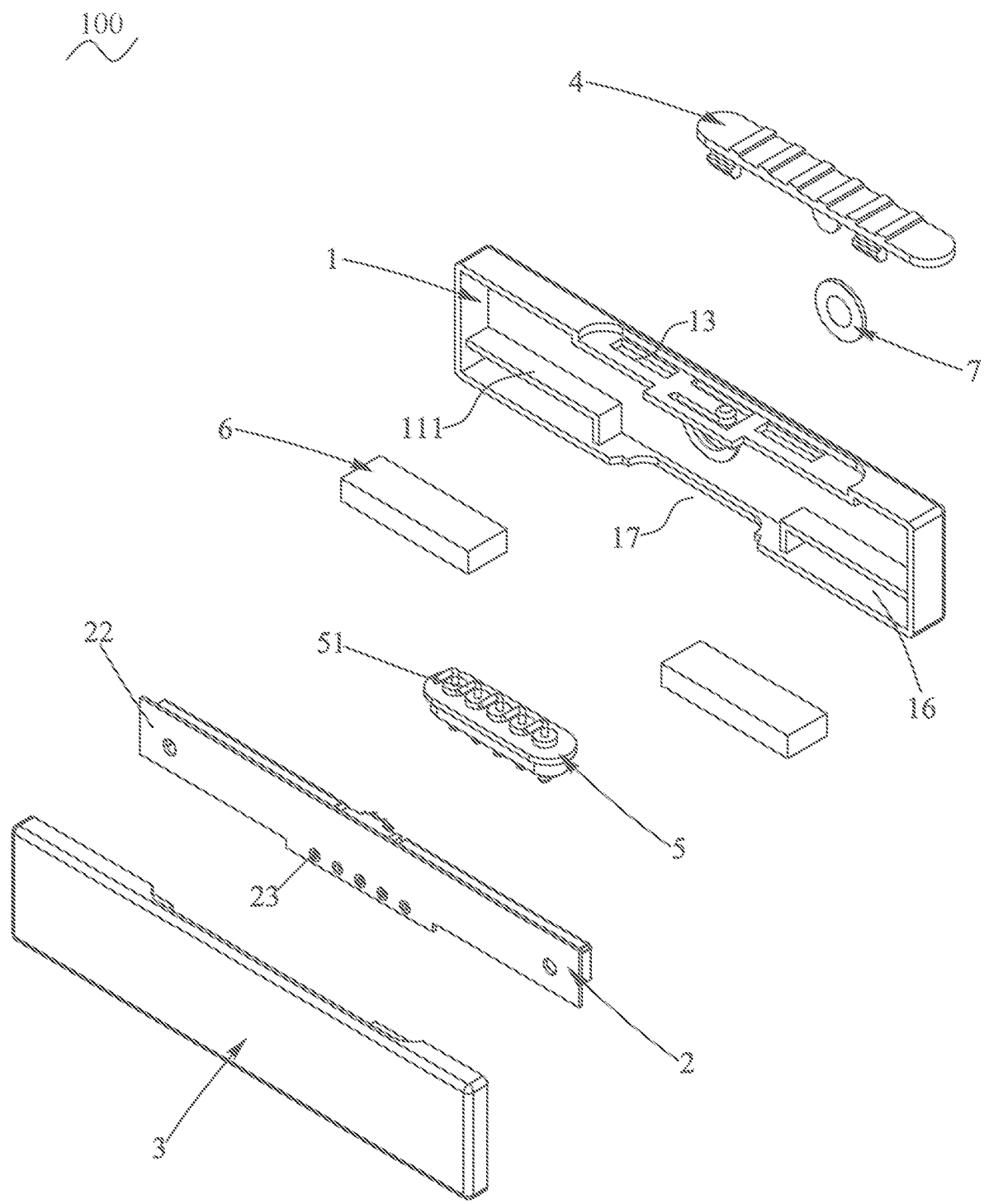
FIG. 5 is another exploded view of the magnetic camera device in accordance with the present invention.
Figure 6:
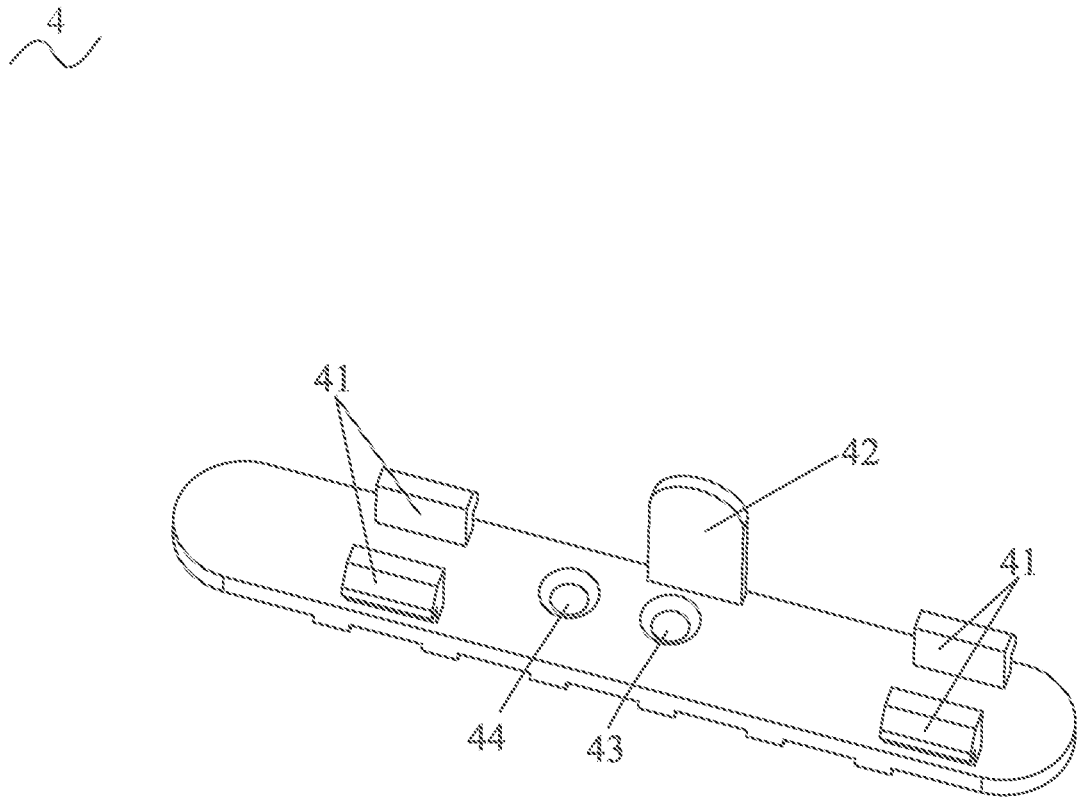
FIG. 6 is a perspective view of a peep prevention switch of the magnetic camera device in accordance with the present invention.
Figure 7:
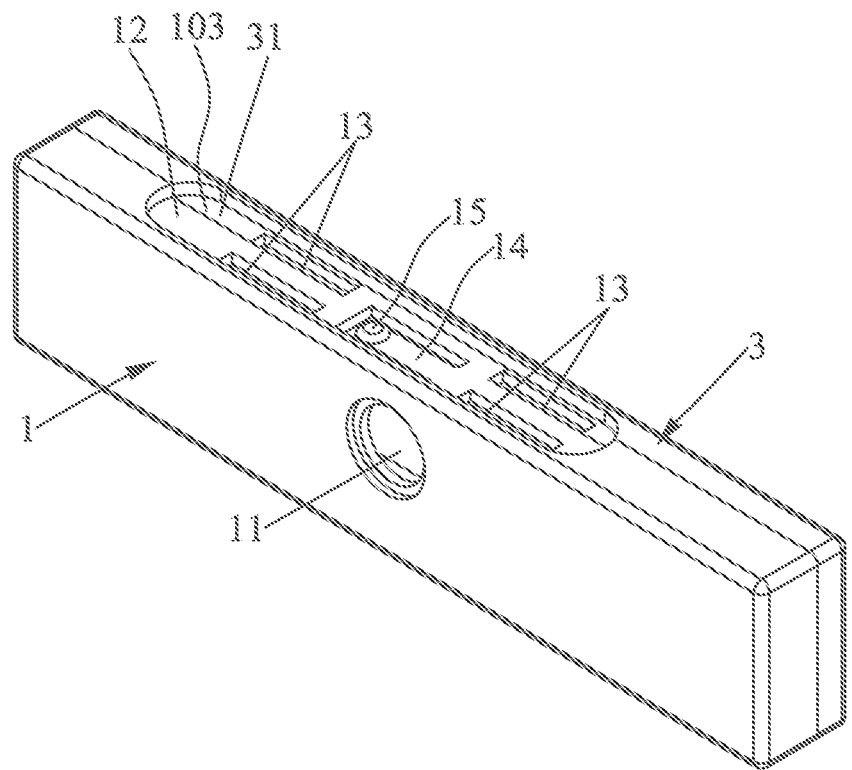
FIG. 7 is a partially assembly view of the magnetic camera device in accordance with the present invention.
Figure 8:
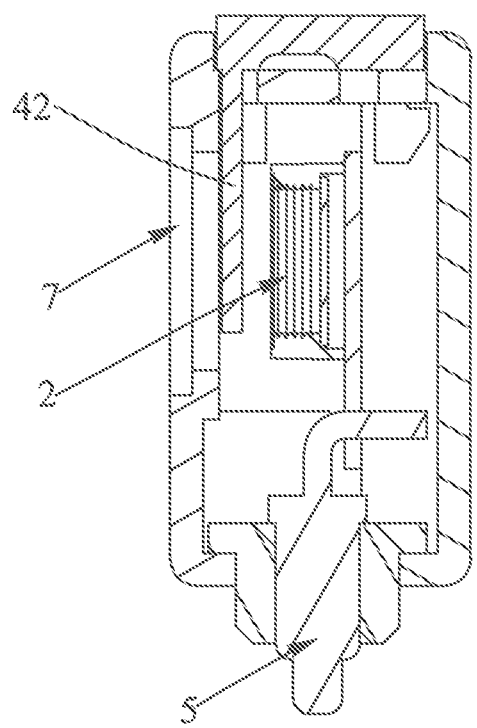
FIG. 8 is a sectional view of the magnetic camera device along a line VIII-VIII of FIG. 2.
Figure 9:
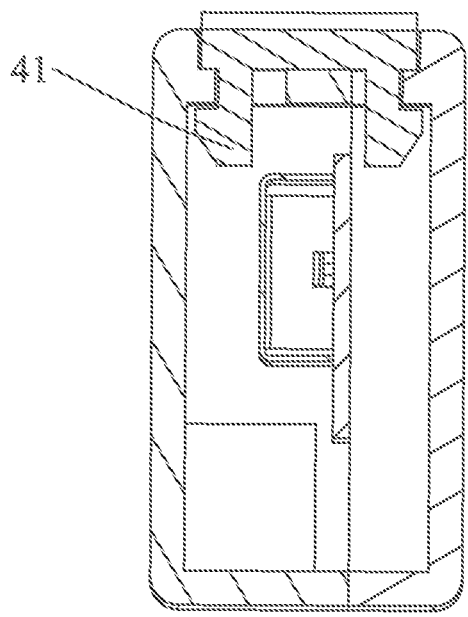
FIG. 9 is a sectional view of the magnetic camera device along a line IX-IX of FIG. 2.
Figure 10:
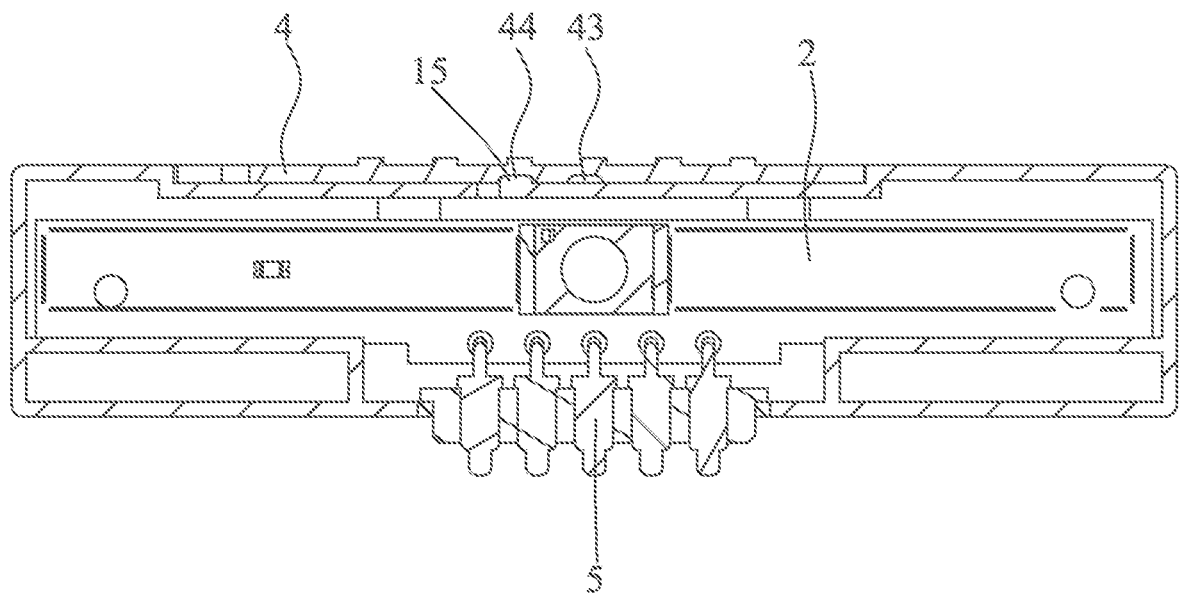
FIG. 10 is a sectional view of the magnetic camera device along a line X-X of FIG. 2.
Figure 11:
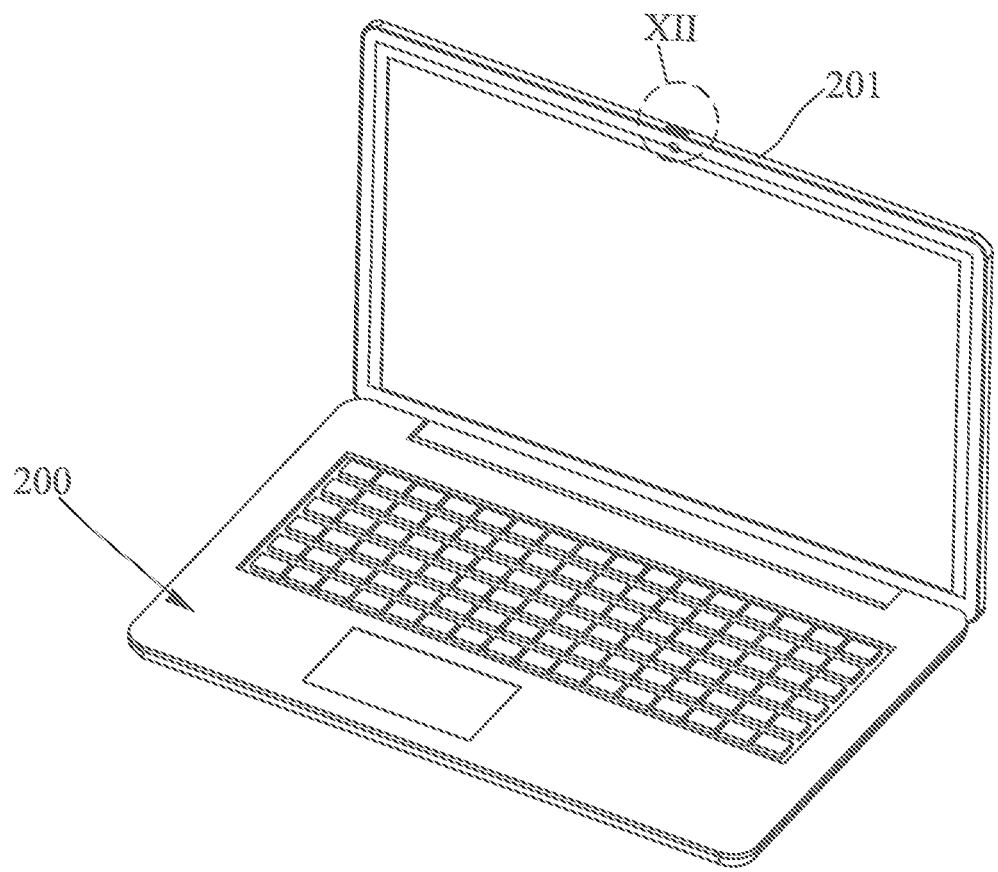
FIG. 11 is a perspective view of the notebook computer according to the present invention.
Figure 12:
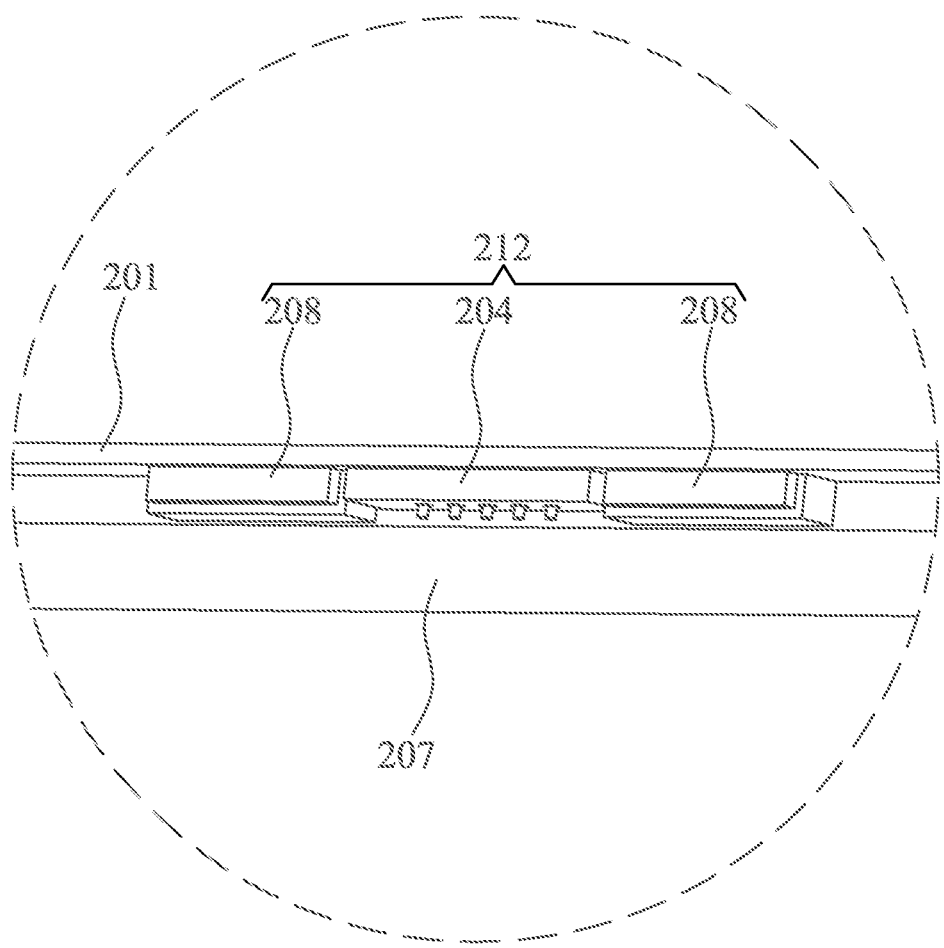
FIG. 12 is a partially enlarged view of an encircled portion XII of the notebook computer of FIG. 11.
Figure 13:
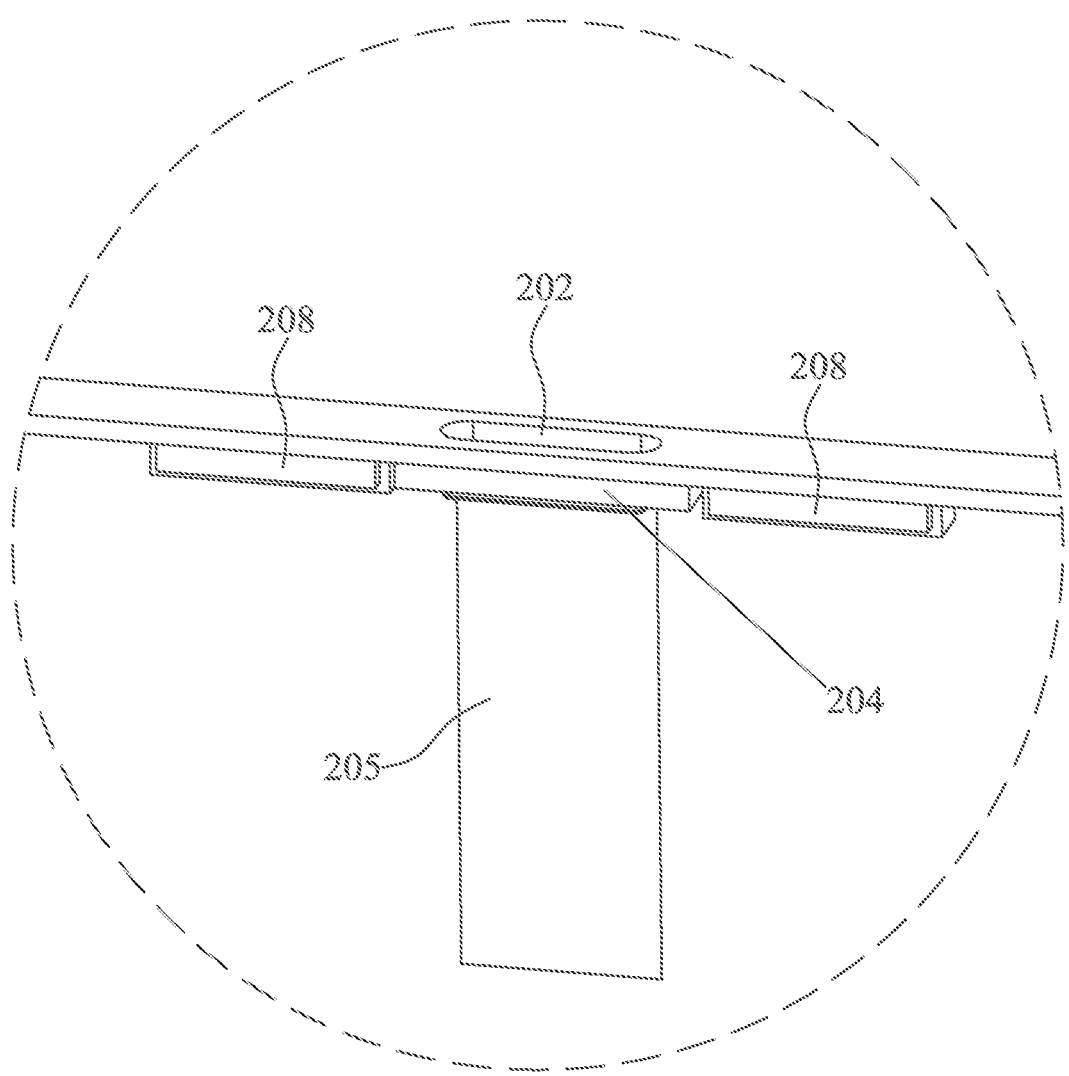
FIG. 13 is a partially enlarged view of the encircled portion XII of the notebook computer of FIG. 11.
Figure 14:
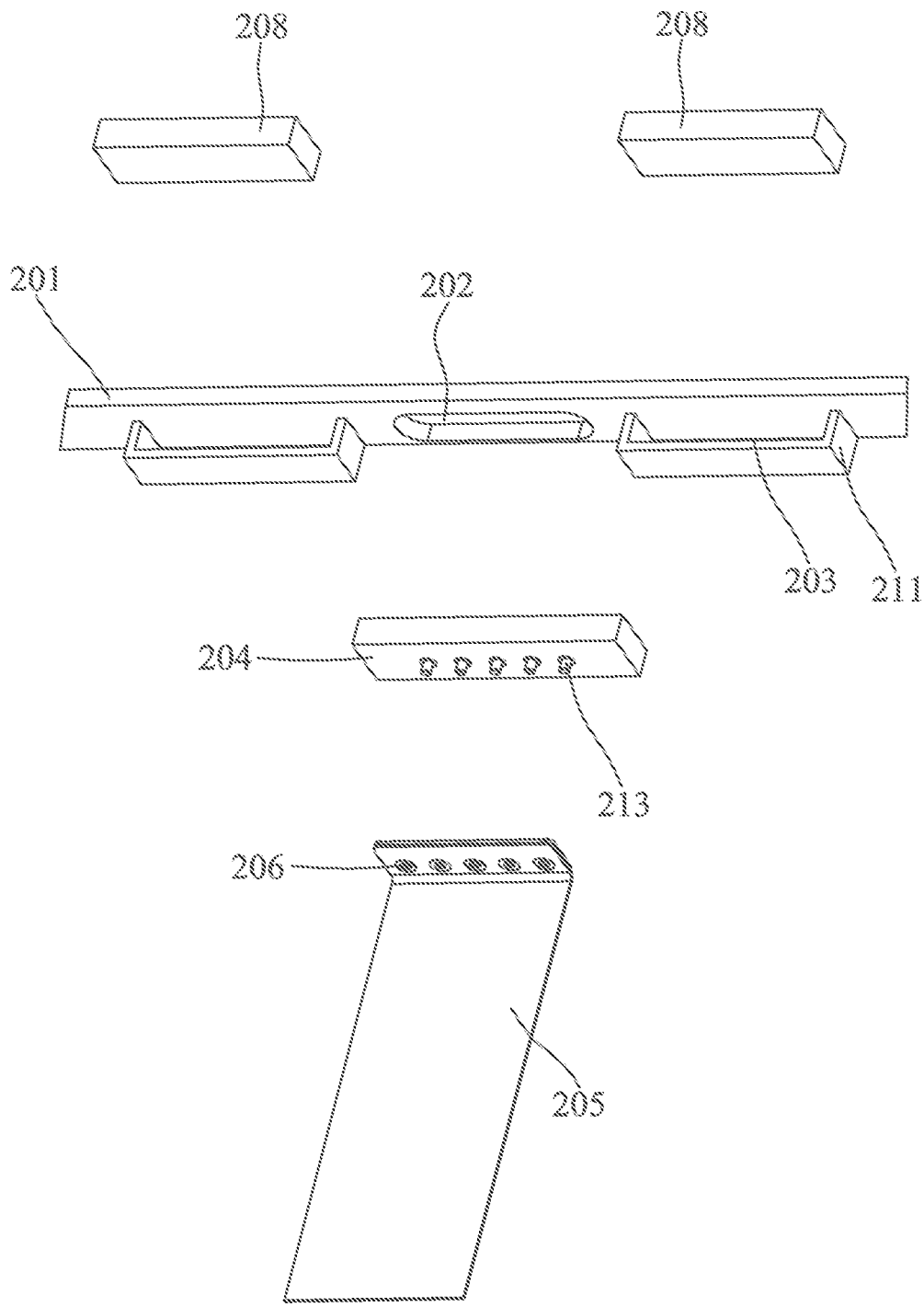
FIG. 14 is a partially exploded view of the notebook computer of FIG. 13.
Figure 15:
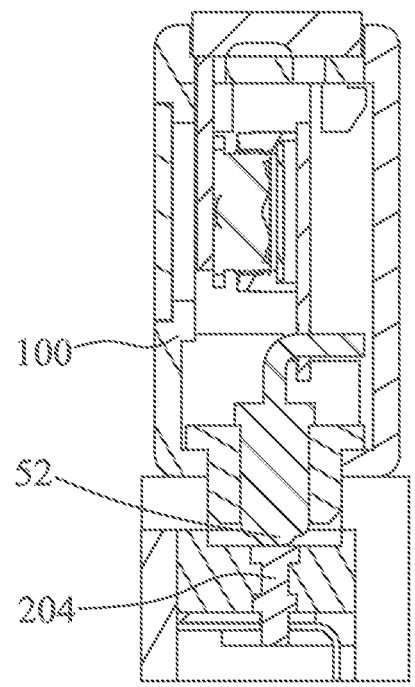
FIG. 15 is a sectional view of the notebook computer along a line XV-XV of FIG. 1.
Figure 16:
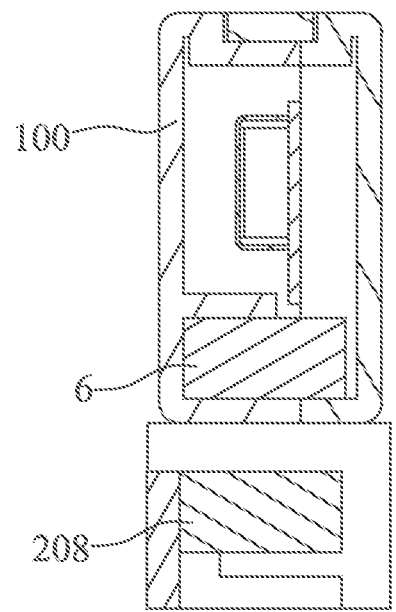
FIG. 16 is a sectional view of the notebook computer along a line XVI-XVI of FIG. 1.

Referring to FIG. 5 and FIG. 10, the image module unit 2 includes a camera module 21 and a circuit board 22. The camera module 21 is used for a video photography. The circuit board 22 has a plurality of first location holes 23. A plurality of soldering feet 51 of the second connector 5 are soldered to positions of the plurality of the first location holes 23 to make the second connector 5 located to and fastened to the image module unit 2.

Referring to FIG. 2 to FIG. 7, the rear cover 3 has a second concave surface 31 and the second notch 32. A middle of a top surface of the rear cover 3 is recessed downward to form the second concave surface 31. A middle of a front of a bottom surface of the rear cover 3 is recessed rearward to form the second notch 32. When the front cover 1 is assembled with the rear cover 3, the second concave surface 31 is matched with and connected with the first concave surface 12 to form a concave surface 103. The top of the shell 101 is recessed downward to form the concave surface 103 for receiving the peep prevention switch 4. The second notch 32 is connected with the first notch 17 to form a receiving space 102. The second connector 5 is partially exposed out of the receiving space 102.

Referring to FIG. 2 to FIG. 10, the peep prevention switch 4 has a plurality of buckling blocks 41, a shielding piece 42, a first buckling groove 43 and a second buckling groove 44. A bottom surface of the peep prevention switch 4 has the plurality of the buckling blocks 41 protruded downward. Several portions of the bottom surface of the peep prevention switch 4 protrude downward to form the plurality of the buckling blocks 41. The bottom surface of the peep prevention switch 4 has the shielding piece 42 extended downward from a middle of one side of the bottom surface of the peep prevention switch 4. The shielding piece 42 of the peep prevention switch 4 is located among the plurality of the buckling blocks 41. The shielding piece 42 is located in front of the image module unit 2. The plurality of the buckling blocks 41 are assembled in the plurality of the sliding holes 13, and each buckling block 41 slides between two opposite ends of one sliding hole 13 to make the shielding piece 42 shield or be without shielding the image module unit 2. In the preferred embodiment, the peep prevention switch 4 has two pairs of the buckling blocks 41 located at two opposite ends of the bottom surface of the peep prevention switch 4.

The shielding piece 42 is arranged between the transparent piece 7 and the image module unit 2 for shielding the image module unit 2 to prevent an embezzlement and a peep of the image module unit 2 being operated by a network hacker. The bottom surface of the peep prevention switch 4 has the first buckling groove 43 and the second buckling groove 44 which are recessed inward. When the peep prevention switch 4 moves towards the first direction 8, the buckling dome 15 is buckled in the second buckling groove 44, and the shielding piece 42 shields the camera module 21 of the image module unit 2. When the peep prevention switch 4 moves towards the second direction 9, the buckling dome 15 is buckled in the first buckling groove 43, and the shielding piece 42 keeps away from the camera module 21 of the image module unit 2 and is without shielding the camera module 21 of the image module unit 2.

Referring to FIG. 3, FIG. 5, FIG. 10 and FIG. 15, the second connector 5 has the plurality of the soldering feet 51 and a plurality of contact portions 52. Several portions of a top surface of the second connector 5 protrude upward and then extend rearward to form the plurality of the soldering feet 51 transversely arranged in a row. Each soldering foot 51 is soldered to one first location hole 23 of the image module unit 2 to make the second connector 5 located to and fastened to the image module unit 2. A bottom surface of the second connector 5 is equipped with the plurality of the contact portions 52 projecting downward. In the preferred embodiment, the second connector 5 is a probe connector. The plurality of the contact portions 52 are exposed out of the receiving space 102, and project beyond the bottom surfaces of the front cover 1 and the rear cover 3.

Referring to FIG. 2 to FIG. 16, the notebook computer 200 has at least one second propping portion 211 and at least one second fastening groove 203. The second connection unit 506 is connected with the first connection unit 212. The first connector 204, the liquid display module 207 and the at least one first magnetic element 208 are mounted to a horizontal portion of the frame 201. The first connector 204 is exposed out of the top of the notebook computer 200. The first connector 204 is directly connected with the second connector 5. The magnetic camera device 100 is magnetically attracted to and fastened to the top of the notebook computer 200. The magnetic camera device 100 is connected with the first connection unit 212 of the notebook computer 200 to be conductive. The plurality of the contact portions 52 of the second connector 5 are exposed out of the shell 101 to directly contact with the first connector 204. The at least one second propping portion 211 is protruded downward from a bottom surface of the horizontal portion of the frame 201. The at least one second propping portion 211 defines the at least one second fastening groove 203. The at least one first magnetic element 208 is fastened in the at least one second fastening groove 203. The at least one second magnetic element 6 is located above and corresponding to the at least one first magnetic element 208. The at least one second magnetic element 6 and the at least one first magnetic element 208 are isolated by the frame 201. The at least one second magnetic element 6 and the at least one first magnetic element 208 are attracted with each other. The plurality of the contact portions 52 of the second connector 5 contact with touching portions of the notebook computer 200 to form a conductive signal wiring by use of a magnetic attraction force between the at least one second magnetic element 6 and the at least one first magnetic element 208.

The notebook computer 200 includes a plurality of second propping portions 211, a plurality of second fastening grooves 203 and a plurality of first magnetic elements 208. The plurality of the second propping portions 211 define the plurality of the second fastening grooves 203 penetrating through front surfaces of the plurality of the second propping portions 211. In the preferred embodiment, the notebook computer 200 has two second propping portions 211, two second fastening grooves 203 and two first magnetic elements 208. The two second propping portions 211 define the two second fastening grooves 203 penetrating through front surfaces of the two second propping portions 211. The two first magnetic elements 208 are fastened in the two second fastening grooves 203, respectively.

A middle of the frame 201 has the insertion groove 202 vertically penetrating through the middle of the frame 201. The insertion groove 202 is located between the two second fastening grooves 203. The insertion groove 202 is used for receiving the second connector 5. One side of the frame 201 has the plurality of the second fastening grooves 203. The plurality of the first magnetic elements 208 are fastened in the plurality of the second fastening grooves 203. Magnetic poles of attracting surfaces between the at least one second magnetic element 6 fastened in the at least one first fastening groove 16 and the at least one first magnetic element 208 fastened in the at least one second fastening groove 203 are different. Magnetic poles of attracting surfaces between each second magnetic element 6 mounted in one first fastening groove 16 of the magnetic camera device 100 and one first magnetic element 208 mounted in one second fastening groove 203 of the notebook computer 200 are different, so when the magnetic camera device 100 is assembled to the notebook computer 200, a correct assembling direction of the magnetic camera device 100 and the notebook computer 200 is identified.

A horizontal portion of the insertion groove 202 is equipped with the first connector 204, when the second connector 5 is arranged in and assembled in an upper side of the insertion groove 202, the plurality of the contact portions 52 of the second connector 5 contact with the first connector 204 of the notebook computer 200 to form the conductive signal wiring by use of the magnetic attraction force between the at least one second magnetic element 6 and the at least one first magnetic element 208. The first connector 204 and the at least one second fastening groove 203 are located at a same side of the notebook computer 200. The horizontal portion of the frame 201 is equipped with the flexible print circuit board 205. The flexible print circuit board 205 and the at least one second fastening groove 203 are located at the same side of the notebook computer 200.

The flexible print circuit board 205 is fastened to the horizontal portion of the frame 201 and is located under the first connector 204. A top of the flexible print circuit board 205 has a plurality of second location holes 206 vertically penetrating through the top of the flexible print circuit board 205. The top of the flexible print circuit board 205 is bent frontward to form an elongated shape. The top of the flexible print circuit board 205 is fastened to a lower surface of the first connector 204. The first connector 204 has a plurality of soldering portions 213 protruded downward. The plurality of the soldering portions 213 of the first connector 204 are soldered to the plurality of the second location holes 206 to locate and fasten the flexible print circuit board 205 to the first connector 204, after the flexible print circuit board 205 is located to and fastened to the first connector 204, the liquid display module 207 is mounted to the horizontal portion of the frame 201 of the notebook computer 200 to make a distance between a front surface of the liquid display module 207 and a rear surface of the frame 201 be narrower so as to conform to a narrow edge design of a modern screen. In the preferred embodiment, the first connector 204 is a pin header connector. The first connector 204 and the at least one first magnetic element 208 form the first connection unit 212. The first connection unit 212 is mounted to the top of the notebook computer 200.

As described above, each second magnetic element 6 is mounted in the one first fastening groove 16 of the magnetic camera device 100, and each first magnetic element 208 is mounted in the one second fastening groove 203 of the notebook computer 200, the magnetic poles of the attracting surfaces between each second magnetic element 6 mounted in the one first fastening groove 16 of the magnetic camera device 100 and the one first magnetic element 208 mounted in the one second fastening groove 203 of the notebook computer 200 are different, so when the magnetic camera device 100 is assembled to the notebook computer 200, the correct assembling direction of the magnetic camera device 100 and the notebook computer 200 is identified, the second connector 5 is arranged in and assembled in the insertion groove 202, the plurality of the contact portions 52 of the second connector 5 contact with the first connector 204 of the notebook computer 200 to form the conductive signal wiring by use of the magnetic attraction force between the at least one second magnetic element 6 and the at least one first magnetic element 208. Furthermore, the magnetic camera device 100 has the shielding piece 42, the shielding piece 42 is arranged between the transparent piece 7 and the image module unit 2 for shielding the image module unit 2 to prevent the embezzlement and the peep of the image module unit 2 being operated by the network hacker, when the peep prevention switch 4 moves towards the first direction 8, the buckling dome 15 is buckled in the second buckling groove 44, the shielding piece 42 shields the image module unit 2, when the peep prevention switch 4 moves towards the second direction 9, the buckling dome 15 is buckled in the first buckling groove 43, the shielding piece 42 keeps away from the image module unit 2. Thus, the magnetic camera device 100 is assembled to the top of the notebook computer 200 by use of the magnetic attraction force between the at least one second magnetic element 6 and the at least one first magnetic element 208, and the magnetic camera device 100 prevents the embezzlement and the peep of the image module unit 2 from being operated by the network hacker.

What is claimed is:

1. A magnetic camera device adapted for being assembled to a notebook computer, the notebook computer having a first connection unit which includes a first connector, and at least one first magnetic element located to at least one side of the first connector, the magnetic camera device being magnetically attracted to and fastened to a top of the notebook computer, the magnetic camera device being connected with the first connection unit to be conductive, the magnetic camera device comprising:
   a shell;
   an image module unit assembled in the shell; and
   a second connection unit assembled in the shell, the second connection unit being connected with the first connection unit, the second connection unit including a second connector connected to the image module unit, and at least one second magnetic element, the second connector having a plurality of contact portions, the plurality of the contact portions of the second connector being exposed out of the shell to directly contact with the first connector, the at least one second magnetic element being fastened in the shell and being adjacent to at least one end of the second connector, magnetic poles of attracting surfaces between the at least one second magnetic element and the at least one first magnetic element being different.

2. The magnetic camera device as claimed in claim 1, wherein the first connector is a pin header connector.

3. The magnetic camera device as claimed in claim 1, wherein the second connector is a probe connector.

4. The magnetic camera device as claimed in claim 1, further comprising a peep prevention switch mounted to a top of the shell, a bottom surface of the peep prevention switch having a plurality of buckling blocks protruded downward, the bottom surface of the peep prevention switch having a shielding piece extended downward from a middle of one side of the bottom surface of the peep prevention switch, the shielding piece being located in front of the image module unit, the shell including a front cover, a middle of a top surface of the front cover being recessed downward to form a first concave surface, the first concave surface having a plurality of the sliding holes penetrating through a top of the front cover and communicated with an inside of the front cover, the plurality of the buckling blocks being assembled in the plurality of the sliding holes, and each buckling block sliding between two opposite ends of one sliding hole to make the shielding piece shield or be without shielding the image module unit.

5. The magnetic camera device as claimed in claim 4, wherein the shielding piece of the peep prevention switch is located among the plurality of the buckling blocks.

6. The magnetic camera device as claimed in claim 4, wherein the shell includes a rear cover, a rear of a bottom surface of the front cover is recessed frontward to form a first notch, a middle of a top surface of the rear cover is recessed downward to form a second concave surface, a middle of a front of a bottom surface of the rear cover is recessed rearward to form a second notch, when the front cover is assembled with the rear cover, the second concave surface is matched with and connected with the first concave surface, the second notch is connected with the first notch to form a receiving space, the second connector is partially exposed out of the receiving space.

7. The magnetic camera device as claimed in claim 4, further comprising a transparent piece, a front surface of the front cover being recessed rearward to form a location portion, a middle of the location portion longitudinally penetrating through the front cover and being communicated with the inside of the front cover, the transparent piece being buckled in and fastened in the location portion.

8. The magnetic camera device as claimed in claim 4, wherein the peep prevention switch slides in a first direction or a second direction, the first direction and the second direction are opposite to each other, a middle of the first concave surface is punched to form a cantilever arm extending in the second direction, a top surface of a tail end of the cantilever arm protrudes upward to form a buckling dome, the bottom surface of the peep prevention switch has a first buckling groove and a second buckling groove which are recessed inward, the image module unit includes a camera module used for a video photography, when the peep prevention switch moves towards the first direction, the buckling dome is buckled in the second buckling groove, and the shielding piece shields the camera module of the image module unit, when the peep prevention switch moves towards the second direction, the buckling dome is buckled in the first buckling groove, and the shielding piece keeps away from the camera module of the image module unit and is without shielding the camera module of the image module unit.

9. The magnetic camera device as claimed in claim 8, wherein the cantilever arm of the front cover is an elastic body.

10. The magnetic camera device as claimed in claim 1, wherein several portions of a top surface of the second connector protrude upward and then extend rearward to form a plurality of soldering feet transversely arranged in a row, the image module unit includes a circuit board, the circuit board has a plurality of first location holes, each soldering foot is soldered to one first location hole of the image module unit.

11. The magnetic camera device as claimed in claim 10, wherein the notebook computer has a flexible print circuit board, a top of the flexible print circuit board has a plurality of second location holes vertically penetrating through the top of the flexible print circuit board, the top of the flexible print circuit board is fastened to a lower surface of the first connector, the first connector has a plurality of soldering portions protruded downward, the plurality of the soldering portions of the first connector are soldered to the plurality of the second location holes.

12. A magnetic camera device adapted for being assembled to a notebook computer, the notebook computer having a frame, a first connector mounted to the frame, at least one first magnetic element mounted to the frame and located to at least one side of the first connector, and a flexible print circuit board fastened to the frame and located under the first connector, the magnetic camera device being magnetically attracted to and fastened to the notebook computer, the magnetic camera device being connected with the notebook computer, the magnetic camera device comprising:
 a shell;
 an image module unit assembled in the shell;
 a second connector connected to the image module unit, the second connector having a plurality of contact portions, the plurality of the contact portions of the second connector being exposed out of the shell to directly contact with the first connector; and
 at least one second magnetic element fastened in the shell and being adjacent to at least one end of the second connector, the at least one second magnetic element being located above and corresponding to the at least one first magnetic element, the at least one second magnetic element and the at least one first magnetic element being attracted with each other, magnetic poles of attracting surfaces between the at least one second magnetic element and the at least one first magnetic element being different;
 wherein a top of the flexible print circuit board is bent to form an elongated shape, the top of the flexible print circuit board is fastened to a lower surface of the first connector.

13. The magnetic camera device as claimed in claim 12, wherein the shell includes a front cover, the front cover has at least one first propping portion protruded upward from a bottom of an inside of the front cover, the at least one first propping portion defines at least one first fastening groove penetrating through a rear surface of the front cover, the at least one second magnetic element is fastened in the at least one first fastening groove, the notebook computer has at least one second propping portion protruded downward from a bottom surface of a horizontal portion of the frame, the at least one second propping portion defines at least one second fastening groove, the at least one first magnetic element is fastened in the at least one second fastening groove, the flexible print circuit board and the at least one second fastening groove are located at a same side of the notebook computer.

14. The magnetic camera device as claimed in claim 12, wherein the notebook computer has a liquid display module, the liquid display module is mounted to the horizontal portion of the frame to make a distance between a front surface of the liquid display module and a rear surface of the frame be narrower.

15. A magnetic camera device adapted for being assembled to a notebook computer, the notebook computer having a first connector, and at least one first magnetic element located to at least one side of the first connector, the first connector being exposed out of a top of the notebook computer, the magnetic camera device being magnetically attracted to and fastened to the top of the notebook computer, the magnetic camera device being connected with the notebook computer, the magnetic camera device comprising:
 a shell;
 an image module unit fastened in an inside of the shell;
 a second connector connected to a lower end of the image module unit and assembled to the top of the notebook computer, the first connector being directly connected with the second connector;
 at least one second magnetic element fastened in the shell and being adjacent to at least one end of the second connector, the at least one second magnetic element being located above and corresponding to the at least one first magnetic element, the at least one second magnetic element and the at least one first magnetic element being attracted with each other, magnetic poles of attracting surfaces between the at least one second magnetic element and the at least one first magnetic element being different; and
 a peep prevention switch mounted to a top of the shell, the peep prevention switch having a plurality of buckling blocks, the peep prevention switch having a shielding piece extended downward from a middle of one side of a bottom surface of the peep prevention switch, the shielding piece being located in front of the image module unit, the shell having a plurality of the sliding holes penetrating through the shell, the plurality of the buckling blocks being assembled in the plurality of the sliding holes, and each buckling block sliding between two opposite ends of one sliding hole to make the shielding piece shield or be without shielding the image module unit.

16. The magnetic camera device as claimed in claim 15, wherein the peep prevention switch slides in a first direction or a second direction, the first direction and the second direction are opposite to each other, the top of the shell is recessed downward to form a concave surface for receiving the peep prevention switch, a middle of the concave surface is punched to form a cantilever arm extending in the second direction, a top surface of a tail end of the cantilever arm protrudes upward to form a buckling dome, the bottom surface of the peep prevention switch has a first buckling groove and a second buckling groove which are recessed inward, several portions of the bottom surface of the peep prevention switch protrude downward to form the plurality of the buckling blocks, the image module unit includes a camera module, when the peep prevention switch moves towards the first direction, the buckling dome is buckled in the second buckling groove, and the shielding piece shields the camera module of the image module unit, when the peep prevention switch moves towards the second direction, the buckling dome is buckled in the first buckling groove, and the shielding piece keeps away from the camera module of the image module unit and is without shielding the camera module of the image module unit.

17. The magnetic camera device as claimed in claim 16, wherein the shell has a front cover and a rear cover, a middle of a top surface of the front cover is recessed downward to form a first concave surface, a middle of a top surface of the rear cover is recessed downward to form a second concave surface, a rear of a bottom surface of the front cover is recessed frontward to form a first notch, a middle of a front of a bottom surface of the rear cover is recessed rearward to form a second notch, when the front cover is assembled with the rear cover, the second concave surface is matched with and connected with the first concave surface to form the concave surface, the second notch is connected with the first notch to form a receiving space, the second connector is partially exposed out of the receiving space, the second connector is a probe connector, and the second connector has a plurality of contact portions exposed out of the receiving space and projecting beyond the bottom surfaces of the front cover and the rear cover.

* * * * *